United States Patent [19]
Lundgren

[11] 3,788,083
[45] Jan. 29, 1974

[54] METHOD OF FITTING PIPING FOR A HOT OR COLD FLUID

[75] Inventor: Jens Ove Lundgren, Orebro, Sweden

[73] Assignee: Rorkonsult For Fjarrvarmei Orebro AB, Orebro, Sweden

[22] Filed: Nov. 15, 1971

[21] Appl. No.: 198,644

[30] Foreign Application Priority Data
Nov. 19, 1970 Sweden.............................. 15697/70
May 28, 1971 Sweden.............................. 6996/71

[52] U.S. Cl..................... 61/72.1, 138/105, 248/49
[51] Int. Cl........................... F16l 27/00, F24d 3/00
[58] Field of Search............ 61/72.1, 72.5, 72.7, 43; 248/49; 138/DIG. 5, 105

[56] References Cited
UNITED STATES PATENTS
| | | | |
|---|---|---|---|
| 3,630,038 | 12/1971 | Ando | 61/72.1 |
| 2,765,135 | 10/1956 | Chellis | 248/49 |
| 3,169,576 | 2/1965 | Lee et al. | 138/DIG. 5 |

Primary Examiner—Jacob Shapiro
Attorney, Agent, or Firm—Toren and McGeady

[57] ABSTRACT

A piping for a hot or a cold fluid may be exposed to harmful stresses when the fluid in the piping changes its temperature. So-called compensators have been used for reducing said stresses. According to the invention the compensators may be omitted if the piping is heated to a temperature between its minimum and maximum operating temperature before it is fixed in the desired position.

3 Claims, 1 Drawing Figure

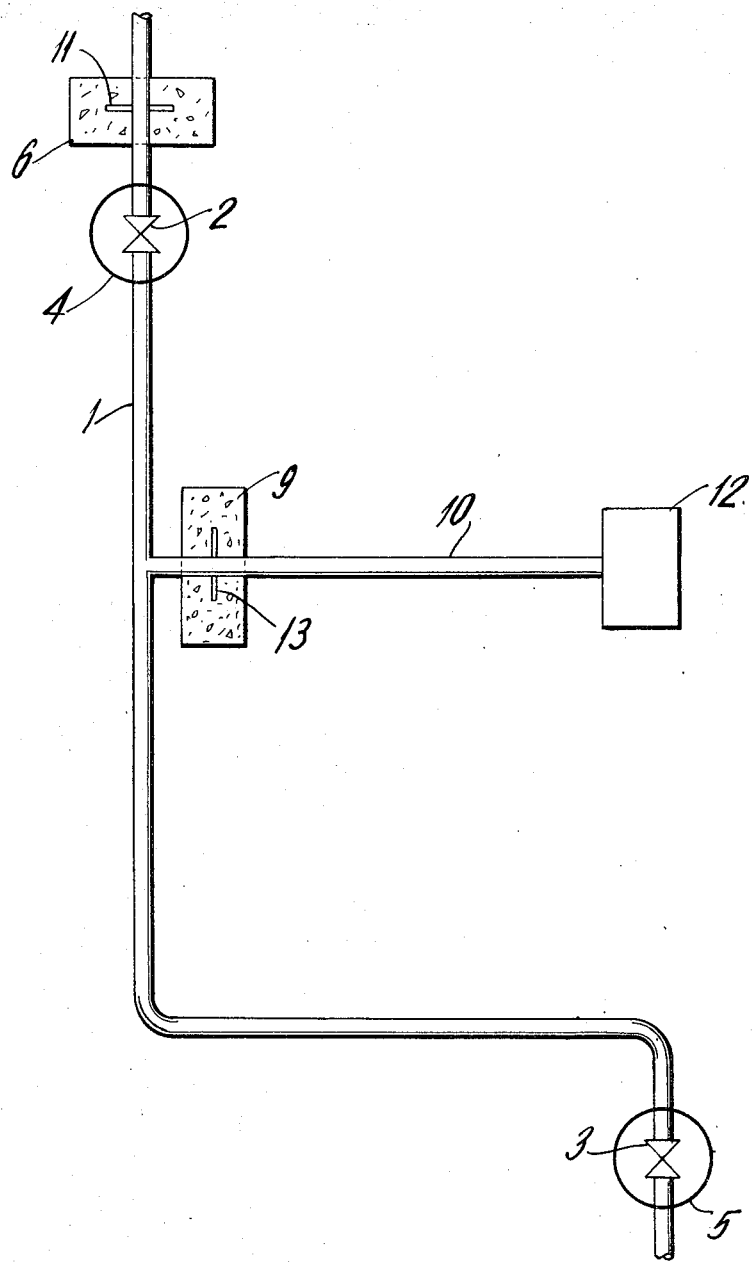

METHOD OF FITTING PIPING FOR A HOT OR COLD FLUID

The invention relates to a method of fitting piping for a hot or cold fluid. The object of the invention is to be able to fit a metallic pipe which will be subjected to temperature variations, without using so-called compensators or other devices which take up the expansion or contraction of the pipe upon a temperature change.

Attempts have been made previously to avoid the use of compensators by fitting the piping at attachment points, for example concrete bases. This has been successful with small temperature variations, but for pipes having very high or very low working temperatures the stress has been so great as the temperature increased that the pipe cracked or the yield point of the material was exceeded.

According to the invention it has now been found that the risk of deformation is eliminated if the piping is first heated or cooled to a temperature above or below the normal temperature of the surroundings and is then fixed in the desired position. The piping should be heated or cooled to a temperature, in the following called the fixing temperature, which is between the minimum and the maximum working temperature of the fluid in the piping.

If the temperature in a pipe for a hot fluid exceeds the fixing temperature, the pipe is subjected to a compressive strain. The fixing temperature should be so close to the maximum working temperature that the pipe can tolerate the maximum compressive stress reached.

If the temperature in the piping falls below the fixing temperature the piping will be subjected to a tensile stress. The lowest working temperature permitted should be chosen so that the tensile stress arising can be tolerated. If, for example at a shut-down, the temperatue shows a tendency to fall so low that impermissible tensile stresses arise in the piping, it must be heated by blowing in steam or hot air, for example. If, for some reason, it is impossible to heat the piping in this way it is better to cut the piping rather than allowing an uncontrolled rupture in the piping. When the piping is being repaired the cut ends can be brought into contact by heating the piping, after which they can be welded.

A similar condition prevails for piping for a cold fluid, but in this case the piping is cooled to a temperature below that of the surroundings and is kept at this temperature during the fixing operation. If a breakdown occurs the temperature of the pipe may increase to the normal temperature of the surroundings, and the fixing temperature should therefore be so close to this normal temperature that the maximum compressive stress reached can be tolerated.

The pipe may be fixed in the desired position by being attached or fastened, at predetermined intervals, to attachment members. Said members may preferably consist of concrete foundations. The piping should be loaded between the attachment members so that the compressive stress does not cause the pipe to crack. For piping laid under ground it should be ascertained that the pressure of the earth is sufficiently high. Attachment members may preferably be applied at pipe bends and at so-called pipe ends, that is where the pipe is provided with a shut-off valve or the like.

According to another embodiment of the invention said attachment members may be omitted. The piping may be fixed in the desired position by being placed in a pipe trench in the ground. The earth is subsequently replaced in the trench, thus surrounding the piping and fixing it in the desired position. Such piping is held in place by so-called friction positioning, by which is meant that when tolerably small movements occur in the longitudinal direction of the piping due to temperature variations, there will be such friction between the piping and the surrounding earth that the tension in the piping is held within permissible limits. When laying pipe in the ground, the piping is placed in the desired position in the pipe trench. It is then heated or cooled to the normal operating temperature or a temperature between the minimum and the maximum operating temperatures, after which earth is replaced in the pipe trench. The pressure of the earth must be so high that the piping does not even crack at the maximum compressive stresses occurring.

In the following the invention will be explained more fully with reference to the accompanying drawing which, by way of example, shows a section of a hot water pipe in a district heating plant. The pipe 1 is a so-called culvert pipe, that is to say it is surrounded by insulation and an outer casing. The pipe is laid in a trench in the ground at such depth that the ground pressure counteracts the cracking tendency occurring when the temperature exceeds the fixing temperature. The pipe is provided with two shut-off valves 2, 3 which are accessible down shafts 4, 5. An attachment member 6, in the form of a concrete foundation, is arranged close to the valve 2. A concrete foundation 9 is also arranged to fix a branch pipe 10 for a heat consumer 12, close to the place where the branch pipe 10 is connected to the main piping 1.

An attachment means 11, 13, is applied to the pipe in each attachment member 6, 9 when the piping is being fitted. The attachment means may comprise wings, flanges, sections or the like, which are welded to the pipe. The piping is then heated, for exmple by its normal heat-transport fluid supplied from the heat-producing unit, steam or hot air, to the desired fixing temperature, the pipe being allowed to expand freely. The concrete foundations 6, 9 are then cast around the attachment means 11, 13, the earth is replaced into the trench, and the temperature is maintained until the concrete has set. In operation, the main pipe 1 is fixed in the desired position by means of the pressure of the earth which has been replaced into the trench. The branch pipe 10 is fixed partly by means of the pressure of the earth, partly by means of the concrete foundation 9. Said concrete foundation 9, which is situated close to the main pipe 1, prevents the main pipe 1 from being exposed to lateral forces produced by the branch pipe 10. The concrete foundation 6 is situated at a place where the main pipe 1 changes its direction from a horizontal direction to a slightly inclined direction. It prevents the main pipe 1 from moving in the vertical direction.

I claim:

1. Method of mounting a hot water pipe in a district heating system in a fixed position for use in conveying hot water which flows through the piping at an operating temperature range of minimum to maximum temperatures above the ambient temperature, comprising the steps of locating a continuous length of piping from a source to a point of use, bringing the piping to a temperature within the range of its operating temperature by flowing hot water through the piping and permitting it to change length freely in response to the temperature to which it is heated by the hot water, and while maintaining the piping at the temperature in its operating range, fixing the piping in the use position.

2. Method, as set forth in claim 1, characterized by fixing the piping in the use position by fastening it at predetermined intervals to concrete attachment members.

3. Method of mounting a hot water pipe in a district heating system in a fixed position for use in conveying hot water which flows through the piping within an operating temperature range of minimum to maximum temperatures above the ambient temperature, comprising the steps of locating a continuous length of piping in a position for use within an excavated earth trench from a source to a position of use, bringing the piping to a temperature within the range of its operating temperature by flowing hot water through the piping and permitting it to change length freely in response to the temperature to which it is heated by the hot water, and while maintaining the piping at the temperature in its operating range, fixing the piping in the use position by fastening it at predetermined intervals to attachment members and by backfilling the earth about the pipe so that the pressure of the backfilled earth holds the piping in the position attained when it is brought to temperature within the range of its operating temperature.

* * * * *